United States Patent [19]
Goto et al.

[11] Patent Number: 5,397,417
[45] Date of Patent: Mar. 14, 1995

[54] PROCESS FOR PRODUCING SPONGE RUBBER STAMP HAVING OPEN CELL

[75] Inventors: Kazumi Goto; Hiroshi Sasaki, both of Kanagawa, Japan

[73] Assignees: Mitsubishi Pencil Kabushiki Kaisha; Tsukasa Felt Shoji Co., Ltd., both of Tokyo, Japan

[21] Appl. No.: 173,367

[22] Filed: Dec. 23, 1993

[30] Foreign Application Priority Data

Dec. 24, 1992 [JP] Japan ................................ 4-344889

[51] Int. Cl.⁶ ............................................. B32B 31/00
[52] U.S. Cl. ................................ 156/272.8; 156/278
[58] Field of Search .............................. 156/278, 272.8

[56] References Cited

FOREIGN PATENT DOCUMENTS

| | | |
|---|---|---|
| 48-41936 | 12/1973 | Japan . |
| 56-27388 | 6/1981 | Japan . |
| 56-40033 | 9/1981 | Japan . |
| 57-5184 | 1/1982 | Japan . |
| 58-30154 | 6/1983 | Japan . |
| 59-16945 | 4/1984 | Japan . |
| 59-28193 | 7/1984 | Japan . |
| 59-31435 | 8/1984 | Japan . |
| 62-4231 | 1/1987 | Japan . |

*Primary Examiner*—Chester T. Barry
*Attorney, Agent, or Firm*—Darby & Darby

[57] ABSTRACT

A process for producing a sponge rubber stamp having open cell of the present invention comprises the steps of superposing an unvulcanized rubber sheet (A) containing a water-easily soluble powder upon an unvulcanized rubber sheet (B) containing an acid-soluble powder, heating/pressing them to form an integral laminate, treating the integral laminate with water to make the layer (A) porous, sculpturing the surface of the layer (B) of the integral laminate by a laser beam to form a stamp surface thereon, and then treating the integral laminate with an aqueous acid solution. No microcracks occur in the stamp at the formation of the stamp surface, and the stamp surface precision and the durability of the obtained stamp are excellent. In addition, the formation of a prototype and a matrix of the stamp as well as the treatment of the stamp can be simplified.

4 Claims, No Drawings

PROCESS FOR PRODUCING SPONGE RUBBER STAMP HAVING OPEN CELL

BACKGROUND OF THE INVENTION (i) Field of the Invention

The present invention relates to a sponge rubber stamp having open cell, and a process for producing the same.

(ii) Description of the Related Art

A conventional stamp has been prepared by first irradiating (exposing) an original plate of a photosetting resin with ultraviolet rays through a negative having a stamp surface pattern, washing the original plate with jetted water to form a relief stamp surface pattern thereon, drying it, exposing it again to form a prototype having the stamp surface pattern thereon, press-bonding a phenol resin or the like onto the prototype under heating to form a matrix, and then press-bonding a rubber stamp material onto this matrix under heating.

In recent years, as stamps which can continuously be used for stamping without using any ink pad at each time of stamping, there have been spread stamps in which a sponge rubber having numerous open cell is used as a stamp material.

As the materials for the sponge rubber stamp having the numerous open cell which have been used to manufacture this kind of stamp, the following materials are known:

a. a rubber material mixed only with a foaming agent,
b. a rubber material mixed with a water-easily soluble salt powder, a curing agent and a filler without using any foaming agent,
c. a rubber material mixed with a water-easily soluble salt powder, a foaming agent, a curing agent and a filler, and
d. a combination of two of the above-mentioned a, b and c.

For example, Japanese Patent Publication No. 48-41936 discloses a method which comprises superposing sheets A and B upon each other, and then carrying out vulcanization to obtain a rubber stamp.

That is, a rubber material is blended with a vulcanizing agent, a filler and a high-temperature closed cell foaming agent, and sodium chloride and a sodium naphthalenesulfonate-formalin condensate are then added thereto, followed by mastication to form a sheet A. On the other hand, the above-mentioned rubber material is blended with a vulcanizing agent, a filler, a low-temperature open cell foaming agent, an intermediate-temperature closed cell foaming agent and a high-temperature closed cell foaming agent, and sodium chloride and a sodium naphthalenesulfonate-formalin condensate are then added thereto, followed by mastication to form a sheet B.

Next, these sheets A and B are closely superposed upon each other, and then placed in a mold having an inside bottom surface formed with relief letters. Afterward, a pressure of about 200 kg/cm$^2$ is applied to the mold so as to press the sheet A against the relief letters, and vulcanization is then carried out at gradually rising temperatures. Next, the molded article is released from the mold, washed with water until sodium chloride or sodium sulfate and the sodium naphthalenesulfonate formalin-condensate have been removed, dehydrated, and then dried to prepare a rubber stamp.

Furthermore, Japanese Patent Publication No. 59-28193 discloses a rubber stamp obtained by treating the following sheets A and B in the same manner as described above. This sheet A is formed by adding sodium chloride, sodium sulfate or sodium nitrate of 200–350 mesh and soluble potato starch of up to 200 mesh to an unvulcanized rubber blend, and the above-mentioned sheet B is formed by adding sodium chloride, sodium sulfate or sodium nitrate of 32–100 mesh and soluble potato starch of 150–250 mesh to an unvulcanized rubber blend.

In these methods, the sheet A is brought into contact with the mold formed with the relief letters, and the sheets A and B are then press-bonded between hot plates to form the rubber stamp.

In the conventional methods, however, a long time is taken to obtain the prototype, the matrix and the sponge rubber stamp, and so production efficiency is low. In addition, there is the problem that the materials have high costs.

On the other hand, another method is known in which a rubber plate is sculptured by the utilization of a laser beam to form a stamp surface.

For example, this technique is disclosed in Japanese Patent Publication Nos. 56-27388, 56-40033, 59-31435 and 62-4231, and this sculpture technique has not been applied to the above-mentioned sponge rubber material.

The present inventors have tried to sculpture the above-mentioned sponge rubber by a laser treatment. However, when a rubber sheet which has previously been made porous is sculptured by the use of the laser, the stamp surface precision of letters or figures is poor. In the case that a rubber sheet which is not porous is used as the material for the laser treatment and it is made porous after the laser treatment, microcracks take place in the rubber sheet when the rubber sheet is detached after the laser treatment, so that the stamp surface is poor in durability.

SUMMARY OF THE INVENTION

An object of the present invention is to solve the above-mentioned problems and to provide a method for efficiently preparing a stamp having open cell by which a sharp point can be obtained even when the stamp is continuously used for a long period of time.

The present inventors have intensively conducted research to solve the above-mentioned problems, and as a result, they have found that the object of the present invention can be achieved by integrally bonding a rubber sheet blended with a water-easily soluble powder to a rubber sheet blended with an acid-soluble powder, followed by a laser treatment.

That is, a process for producing a sponge rubber stamp having open cell of the present invention comprises the steps of superposing an unvulcanized rubber sheet (A) containing a water-easily soluble powder upon an unvulcanized rubber sheet (B) containing an acid-soluble powder, heating/pressing them to form an integral laminate, treating the integral laminate with water to make the layer (A) porous, sculpturing the surface of the layer (B) of the integral laminate by a laser beam to form a stamp surface thereon, and then treating the integral laminate with an aqueous acid solution.

Preferably, at least one selected from the group consisting of sodium chloride, sodium sulfate, potassium carbonate, aluminum sulfate and sodium nitrate is used as the water-easily soluble powder of the sheet (A), and at least one selected from the pulverized powder group consisting of calcium carbonate, shell, aleurone, Paris white, zinc, aluminium, copper, iron, zinc oxide, copper oxide, ferric oxide, zinc hydroxide, aluminium hydroxide and ferric hydroxide is used as the acid-soluble powder of the sheet (B).

DETAILED DESCRIPTION OF PREFERRED EMBODIMENTS

An unvulcanized rubber sheet (A) which can be used in a preparation method of the present invention can be formed by carrying out an intensive mastication of a blend of a vulcanizing agent, a filler, an anti-aging agent, a softening agent, a rubber material and the like using a kneader to obtain a rubber composition, followed by mixing the resulting rubber composition with an easily water-soluble powder and rolling the mixture through a calender roll.

An unvulcanized rubber sheet (B) which can be used in the preparation method of the present invention can be formed by carrying out an intensive mastication of a blend of a vulcanizing agent, a filler, an anti-aging agent, a softening agent, a rubber material and the like using a kneader to obtain a rubber composition, followed by mixing the resulting with an acid-soluble powder, and then rolling the mixture through the calender roll.

With regard to amounts of the materials to be blended in the formation of both the sheets, the amount of the vulcanizing agent is 0.3 to 5 parts by weight; that of a vulcanizing accelerator is 0.5 to 5 parts by weight; that of the filler 50 to 110 parts by weight; that of the anti-aging agent is 1 to 3 parts by weight; and that of the softening agent is 5 to 20 parts by weight with respect to 100 parts by weight of the rubber material. Furthermore, the amount of the water-easily soluble powder is 70 to 400 parts by volume and that of the water-easily soluble powder is 70 to 400 parts by volume with respect to 100 parts by volume of the rubber composition comprising the rubber material, the vulcanizing agent, the filler and the like. As for the thickness of the respective sheets, the thickness of the sheet (A) is 1 to 2 mm, preferably 1.2 to 1.5 mm, and that of the sheet (B) is 3 to 4 mm, preferably 3.5 to 3.8 mm.

In the preparation method of the present invention, the sheets (A) and (B) are heated and pressed to integrally bond them, but in this case, conditions are 150° to 180° C., 100 to 200 kg/cm², and 5 to 20 minutes.

After the integral bonding, the thus obtained integral laminate is treated with water to make the sheet (A) porous. This water treatment means the immersion of the laminate into water or washing with water, and water to be used may be warm water or cold water. It is the purpose of the water treatment to remove the water-easily soluble powder from the sheet (A), and no particular restriction is put on the time of the water treatment but it is usually in the range of 12 to 48 hours. After the water treatment, the laminate is preferably dried.

The sheet layer (B) of the integral laminate is sculptured with a laser beam to form a stamp surface. The formation of the stamp surface is achieved by first forming a print pattern original by phototypesetting/constitution, scanning this print pattern original, processing the scanned data by an image scanner, and then directly irradiating the sheet layer (B) of the laminate with the laser beam on the basis of the data to sculpture the pattern in the sheet (B). This operation can be carried out by a computer.

As the laser beam, a carbon dioxide gas laser is usually used, and its intensity is 80 to 400 W, and the size of its spot is 40 to 80 μm.

In the preparation method of the present invention, the thus formed print surface is then treated with an aqueous acid solution. Examples of the usable acid include hydrochloric acid, sulfuric acid and nitric acid. The concentration of the acid is in the range of 5 to 20%, preferably 5 to 10%. Treatment temperature is in the range of 10° to 40° C., preferably 20 to 30° C. After the acid treatment, the laminate is usually washed with water, and then dried.

Examples of the water-easily soluble powder which can be used in the preparation method of the present invention include sodium chloride, sodium sulfate, potassium carbonate, aluminum sulfate and sodium nitrate.

Examples of the acid-soluble powder which can be used in the preparation method of the present invention include a powder mainly comprising calcium carbonate such as a shell powder obtained by calcining and then grinding shells, aleurone, Paris white, calcium carbonate and the like, finely pulverized metal such as zinc, aluminium, copper, iron and the like, finely pulverized metal oxides such as zinc oxide, copper oxide, ferric oxide and the like, and finely pulverized metal hydroxides such as zinc hydroxide, aluminum hydroxide, ferric hydroxide and the like. The preferred grain of acid-soluble powder has a particle size of 0.001 to 0.015 mm.

(1) Examples of the vulcanizing agent include sulfur, its homologous compounds (selenium and tellurium), and usually usable vulcanizing agents such as sulfur-containing organic compounds, organic peroxides, metal oxides (MgO, PbO, ZnO and the like) and organic polyvalent amines. In addition, examples of the vulcanizing accelerator include tetramethylthiuram disulfide and n-cyclohexyl-2-benzothiazolesulfenamide.

(2) Examples of the filler include calcium carbonate, colloidal clay, silicon dioxide, carbon black, barium sulfate and magnesium carbonate.

(3) Examples of the anti-aging agent include aromatic amines, hydroquinone and aldehyde-amide condensates.

(4) Examples of the softening agent include process oil, pine-tar, dibutyl phthalate and tricresyl phosphate.

(5) Examples of the rubber material include natural rubbers, and synthetic rubbers such as styrene-butadiene rubber (SBR), butadiene-acrylonitrile rubber (NBR), isoprene and chloroprene.

According to the preparation of the present invention, no microcracks occur in the stamp at the time of the treatment of the stamp surface, and the stamp surface precision of the obtained stamp and durability of the stamp are excellent.

In addition, production efficiency can be improved, so that the conventional problem of high cost can also be solved.

In a process for producing a sponge rubber stamp having open cell of the present invention, no microcracks occur in the stamp during process, and the stamp surface precision and the durability of the obtained stamp are excellent. In addition, the formation of a prototype and a matrix of the stamp as well as the treatment of the stamp can be simplified, which leads to the improvement of production efficiency.

In the stamp of the present invention, calcium carbonate constituting the layer (B) in which a relief pattern is sculptured contributes to the formation of the stamp surface with cell having suitable diameters, and therefore it is considered that the flow of an ink can be suitably controlled.

Now, the present invention will be described in more detail in reference to an example, but the scope of the present invention should not be limited to the example at all.

In the example and comparative examples, every "parts" are by weight unless otherwise specified.

EXAMPLE 1

To 100 parts of a synthetic rubber (NBR) (Japan Synthetic Rubber Co., Ltd., JSRN-237H (acrylonitrile content 34%, Mooney viscosity $ML_{1+4}(100.C)$ 72, specific gravity 0.98)) where added 0.3 parts of sulfur, 5 parts of zinc oxide, 2 parts of tetramethylthiuramdisulfide, 2 parts of n-cyclohexyl-2-benzothiazolylsulfenamide, 8 parts of dioctyl phthalate (DOP), 75 parts of carbon black and 2 parts of a condensate of diphenylamine and acetone, and followed by mastication to obtain a rubber composition. Afterward, 260 parts by volume of calcium carbonate having a particle diameter of 0.003 to 0.01005 mm were added to 100 parts by volume of the rubber composition, followed by blending, and a sheet (B) having a thickness of 1.5 mm was then formed by rolling the mixture through the calender roll.

Similarly, to 100 parts of the synthetic rubber (NBR) were added 0.3 part of sulfur, 5 parts of zinc oxide, 2 parts of tetramethylthiuramdisulfide, 2 parts of n-cyclohexyl-2-benzothiazolylsulfenamide, 8 parts of DOP, 100 parts of carbon black and 2 parts of a condensate of diphenylamine and acetone, and followed by mastication to obtain a rubber composition. Afterward, 400 parts by volume of sodium chloride having a particle diameter of 0.090 to 0.30 mm which was a water-easily soluble powder were added to 100 parts by volume of the rubber composition, followed by blending, through the calender roll, and a sheet (A) was then formed by rolling the mixture.

Both the sheets were superposed upon each other and then pressed by a hot press at 150° C. for 15 minutes to integrally bond them. Next, the thus obtained stamp material was washed with water to remove sodium chloride therefrom, and then dried to obtain a stamp in which the layer (A) was made porous and the layer (B) was cured.

The surface of the layer (B) of the stamp material was sculptured by a carbon dioxide gas laser having an intensity of 300 W and a spot of 50 $\mu$m to form a stamp surface thereon.

Next, the stamp was immersed in 8% hydrochloric acid at ordinary temperature for 12 hours to completely remove calcium carbonate from the layer (B), washed with water, and then dried to obtain a sponge rubber stamp.

The layers A and B of this stamp were filled with a pigment ink of 400–1,500 c.p.s., and the stamp was then affixed. At this time, any cracks and any cutout were not observed in the print surface and any feathering was not observed, and a very sharp imprint of the stamp could be obtained.

Comparative Example 1

The same procedure as in Example 1 was carried out to form sheets (B) and (A). Both the sheets were then integrally superposed upon each other and then pressed by a hot press at 150° C. for 15 minutes to obtain a stamp material which had not undergone water washing.

The layer (B) of this stamp material was laser-sculptured in the same manner as in Example 1, and then washed with water. Afterward, the stamp was immersed in 8% hydrochloric acid at ordinary temperature for 12 hours to completely remove calcium carbonate from the layer (B), washed with water, and then dried to obtain a sponge rubber stamp.

This sponge rubber stamp was filled with the same ink as in Example 1, and the stamp was then affixed. At this time, some cracks were observed in a print surface, so that a sharp imprint could not be obtained.

Comparative Example 2

The same procedure as in Example 1 was carried out to form sheets (B) and (A). Both the sheets were then superposed upon each other and then pressed by a hot press at 150° C. for 15 minutes to integrally bond them.

Next, the thus obtained integral laminate was washed with water prior to a laser treatment, immersed in 8% hydrochloric acid at ordinary temperature for 12 hours, washed with water, and then dried in the same manner as in Example 1 to obtain a sponge rubber stamp.

The layer (B) of this porous stamp was laser-sculptured in the same manner as in Example 1 to form a stamp surface thereon. Next, the stamp was washed with water, and then dried to obtain a stamp.

This stamp was filled with the same ink as in Example 1, and the stamp was then affixed. At this time, any cracks were not observed, but the edges of letters and figures were rough, so that a sharp imprint could not be obtained.

Comparative Example 3

To 100 parts of a synthetic rubber (NBR) were added 0.3 part of sulfur, 5 parts of zinc oxide, 2 parts of tetramethylthiuramdisulfide, 8 parts of DOP, 75 parts of carbon black and 2 parts of a condensate of diphenylamine and acetone, and followed by mastication to obtain a rubber composition. Afterward, 260 parts by volume of sodium chloride having a particle diameter of 0.053 to 0.105 mm were added to 100 parts by volume of the rubber composition, followed by blending, and a sheet (B) was then formed by rolling the mixture through the calender roll.

Similarly, To 100 parts of a synthetic rubber (NBR) were added 0.3 part of sulfur, 5 parts of zinc oxide, 2 parts of tetramethylthiuram disulfide, 8 parts of DOP, 100 parts of carbon black and 2 parts of a condensate of diphenylamine and acetone, and followed by mastication to obtain a rubber composition. Afterward, 400 parts by volume of sodium chloride having a particle diameter of 0.090 to 0.30 mm were added to 100 parts by volume of rubber composition, followed by blending, and a sheet (A) was then formed by rolling the mixture through the calender roll.

Both the sheets were superposed upon each other and then pressed by a hot press at 150° C. for 15 minutes to integrally bond them. Next, the thus obtained integral laminate was sculptured in the same manner as in Example 1 to obtain a stamp.

Next, the stamp was washed with water, and then dried to obtain a sponge rubber stamp.

Afterward, this stamp was filled with the same ink as in Example 1, and the stamp was then affixed. At this time, some cracks were observed in a print surface, and the stamp surface had pores having a larger diameter than in Example 1 using calcium carbonate, so that an excess amount of the ink ran and any sharp imprint could not be obtained.

What is claimed is:

1. A process for producing a sponge rubber stamp having open cells which comprises the steps of:
   superposing an unvulcanized rubber sheet (A) containing a water soluble powder upon an unvulcanized rubber sheet (B) containing an acid-soluble powder; thereafter
   heating and pressing together the rubber sheets (A) and (B) to form an integral laminate; thereafter
   treating the integral laminate with water to make layer (A) porous without also making layer (B) porous; thereafter
   sculpturing with a laser beam the surface of layer (B) of the integral laminate to form a stamp surface in relief; and thereafter
   treating the integral laminate with an aqueous acid solution to make layer (B) porous.

2. The process for producing a sponge rubber stamp according to claim 1 wherein the amount of said unvulcanized rubber sheet (A) is in the range of 70 to 400 parts by volume with respect to 100 parts by volume of a rubber composition, and the amount of said unvulcanized rubber sheet (B) is in the range of 70 to 400 parts by volume with respect to 100 parts by volume of the rubber composition (wherein, said rubber composition contains 0.3–5 parts by weight of a vulcanizing agent, 0.5–5 pars by weight of a vulcanizing accelerator, 50–110 parts by weight of a filler, 1–3 parts by weight of an anti-aging agent and 5–20 parts by weight of a softening agent with respect to 100 parts by weight of the rubber composition).

3. The process for producing a sponge rubber stamp according to claim 1 wherein said water soluble powder is at least one selected from the group consisting of sodium chloride, sodium sulfate, potassium carbonate, aluminum sulfate and sodium nitrate, and said acid-soluble powder is at least one selected from the pulverized powder group consisting of calcium carbonate, shell, powder aleurone, Paris white, zinc, aluminium, copper, iron, zinc oxide, copper oxide, ferric oxide, zinc hydroxide, aluminium hydroxide and ferric hydroxide.

4. The process for producing a sponge rubber stamp according to claim 1 wherein said laser beam is a carbon dioxide gas laser having an intensity of 80–400 W and a spot size of 40–80 $\mu$m.

* * * * *